US011703672B2

(12) United States Patent
Schumann

(10) Patent No.: US 11,703,672 B2
(45) Date of Patent: Jul. 18, 2023

(54) MICROSCOPIC TRANSMITTED LIGHT CONTRASTING METHOD

(71) Applicant: LEICA MICROSYSTEMS CMS GMBH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 248 days.

(21) Appl. No.: 17/292,013

(22) PCT Filed: Nov. 8, 2019

(86) PCT No.: PCT/EP2019/080710
§ 371 (c)(1),
(2) Date: May 7, 2021

(87) PCT Pub. No.: WO2020/094851
PCT Pub. Date: May 14, 2020

(65) Prior Publication Data
US 2022/0035146 A1 Feb. 3, 2022

(30) Foreign Application Priority Data
Nov. 9, 2018 (DE) .......................... 102018128083.1

(51) Int. Cl.
G02B 21/14 (2006.01)
G02B 21/12 (2006.01)
G02B 21/36 (2006.01)
(52) U.S. Cl.
CPC ........... G02B 21/14 (2013.01); G02B 21/125 (2013.01); G02B 21/367 (2013.01)
(58) Field of Classification Search
CPC .... G02B 21/14; G02B 21/125; G02B 21/367; G02B 21/00; G02B 21/0004;
(Continued)

(56) References Cited

U.S. PATENT DOCUMENTS 5,708,526 A 1/1998 Stankewitz
2002/0191281 A1* 12/2002 Osa .................. G02B 21/086
359/368

(Continued)

FOREIGN PATENT DOCUMENTS

DE 4236803 A1 5/1994
DE 102009003682 A1 9/2010
DE 102013110497 A1 10/2014

OTHER PUBLICATIONS

Teague, Michael Reed, "Deterministic phase retrieval: a Green's function solution," J. Opt. Soc. Am. vol. 73 (Nov. 1983), pp. 1434-1441, Optical Society of America, US.

(Continued)

Primary Examiner — Arnel C Lavarias
(74) Attorney, Agent, or Firm — Leydig, Voit & Mayer, Ltd.

(57) ABSTRACT

A microscopic transmitted light contrasting method includes illuminating a sample through asymmetrical first and second illumination pupils and imaging the sample through asymmetrical first and second detection pupil in order to generate, respectively, first and second partial images. The first illumination pupil and the first detection pupil, as well as the second illumination pupil and the second detection pupil, are arranged pivoted in relation to one another and partially overlapping in projection on a plane perpendicular to an optical axis in such a way that first and third regions of an angular space are in a bright field and second and fourth regions of the angular space are in a dark field, and the first and second partial images each have a bright and a dark field component. An image of the sample is generated from the first and second partial images.

16 Claims, 10 Drawing Sheets

(58) Field of Classification Search
CPC  G02B 21/002; G02B 21/0032; G02B 21/004; G02B 21/0044; G02B 21/0052; G02B 21/008; G02B 21/06; G02B 21/10; G02B 21/12; G02B 21/36; G02B 21/361
USPC ....... 359/385, 362, 363, 368, 369, 387, 388, 359/389
See application file for complete search history.

(56) References Cited

U.S. PATENT DOCUMENTS

2014/0354983 A1  12/2014  Kolchin et al.
2017/0276613 A1   9/2017  Liu et al.

OTHER PUBLICATIONS

Born, Max and Emil Wolf, "Principles of Optics", 7th ed. ISBN 978-0-521-6422-4, 10.6.3 "Imaging with partially coherent quasi-monochromatic illumination," Cambridge University Press, UK, Dec. 2011, pp. 599-606.

N. Streibl, "Three-dimensional imaging by a microscope," J. Opt. Soc. Am. A, vol. 2 (Feb. 1985), pp. 121-127, Optical Society of America, US.

Lee, Wonchan et al., "Single-exposure quantitative phase imaging in color-coded LED microscopy," Opt. Exp. vol. 25 (Apr. 3, 2017), pp. 8398-8411, The Optical Society, US.

Chen, Michael et al., "3D differential phase contrast microscopy," Biomed. Opt. Exp. vol. 7 (Oct. 1, 2016), pp. 3940-3948, Optical Society of America, US.

Tian, Lei; Waller, Laura: "Quantitative differential phase contrast imaging in an LED array microscope". In: Optics Express (OpEx). Apr. 22, 2015, vol. 23, No. 9, pp. 11394-11403, Optical Society of America, US.

Lu, Hangwen et al: "Quantitative phase imaging and complex field reconstruction by pupil modulation differential phase contrast", Optics Express, vol. 24, No. 22, Oct. 31, 2016, pp. 25345-25361, The Optical Society, US.

Phillips, Zachary F. et al.: "Single-shot quantitative phase microscopy with color-multiplexed differential phase contrast (cDPC)", PLOS One, vol. 12, No. 2, Feb. 2, 2017, pp. 1-14, Public Library of Science, US.

* cited by examiner

MICROSCOPIC TRANSMITTED LIGHT CONTRASTING METHOD

CROSS REFERENCE TO RELATED APPLICATIONS

This application is a U.S. National Phase application under 35 U.S.C. § 371 of International Application No. PCT/EP2019/080710, filed on Nov. 8, 2019, and claims benefit to German Patent Application No. DE 10 2018 128 083.1, filed on Nov. 9, 2018. The International Application was published in German on May 14, 2020 as WO 2020/094851 under PCT Article 21(2).

FIELD

The invention relates to a microscopic transmitted light contrasting method and a device for carrying out a microscopic transmitted light contrasting method.

BACKGROUND

Various phase contrast methods are known in the field of light microscopy, which are intended to improve the image contrast in particular in the imaging of biological samples. The most well-known such methods are the phase contrast according to Zernike and the differential interference contrast according to Nomarski, which are also available in conventional transmitted light microscopes.

The classic phase contrast method according to Zernike provides covering an illumination-sidelight ring with a phase ring, which is located in the objective pupil. The necessity of such coverage is disadvantageous in particular if sample-induced pupil aberrations occur. Thus, for example, in liquid-filled sample containers of small cross section, as represented, for example by the individual depressions of a microtitration plate, a significantly more pronounced liquid meniscus results due to the surface tension of the liquid, which results in an offset of the illumination pupil upon transmission through the sample. Permanent coverage of light ring and phase ring is not possible under these circumstances.

In the differential interference contrast method according to Nomarski, abbreviated DIC, the illumination light is split by a Wollaston prism into two partial beams, which are coherent in relation to one another but are laterally offset in relation to one another in the sample.

These two partial beams are brought into superposition and interference by a further Wollaston prism on the objective side. This polarization-related splitting of the two partial beams in the DIC method has the result that a birefringence, as occurs due to the bottom of a sample vessel typically manufactured from plastic, for example, results in significant worsening of the contrast as a result of the accompanying influencing of the polarization. Since this undesired birefringence cannot be avoided in the manufacturing of conventional plastic sample vessels, the DIC method according to Nomarski is not applicable, for example in plastic petri dishes or plastic microtitration plates.

Furthermore, a rapidly expanding field of computer-implemented transmitted light contrasting methods exists, for example a method referred to as differential phase contrast, described in L Tian & L Waller, *Opt. Exp.* 23 (2015), 11394, a method referred to as transport of intensity imaging, described in M. Teague, *J. Opt. Soc. Am.* 73 (1983), 1434, and a method referred to as pupil modulation contrast, described in H. Lu et al., *Opt. Exp.* 24 (2016), 23545. These methods are based on the fact that by knowing the optical transfer function, see, for example Born & Wolf, *Principles Of Optics,* 7th ed. ISBN 978-0-521-6422-4, 10.6.3. *Imaging with partially coherent quasi-monochromatic illumination,* or its linear approximation, which is also known as the Weak Object Transfer Function and is described, for example in N. Streibl, *J. Opt. Soc. Am.* A 2 (1985), 121, a quantitative reconstruction of phase and absorption information of a sample is possible. This can take place both in two and also in three dimensions. These methods have the disadvantage that they require a specific ratio of illumination aperture to detection aperture. Thus, in the case of differential phase contrast, the illumination aperture has to be greater than or equal to the detection aperture. In pupil modulation contrast, the illumination aperture has to be less than or equal to the detection aperture.

The above-mentioned computer-implemented transmitted light contrasting methods have several disadvantages, however. The differential phase contrast requires complete illumination of the objective pupil by the transmitted light illumination system, if small to infinitesimal amounts of the phase transfer function are not to occur at low spatial frequencies. This method is thus not universally applicable with acceptable complexity in a compound microscope, in particular upon the use of high-aperture immersion objectives, since complete illumination of the objective pupil is linked to high complexity here. For transport-of-intensity imaging, it is necessary to record images at different defoci of the sample. Independently of whether these defoci are implemented by a classic focusing drive, i.e., by a movement of an object table or objective revolver, a focusable lens, for example a lens based on liquid, wavefront manipulators, for example spatial light modulators (SLM), or deformable mirrors, multiple images have to be recorded in chronological succession. The image recording rate is reduced in this way, and in the case of a dynamic sample, image artifacts are possibly generated. An implementation using multiple differently focused cameras is conceivable, but is complex and could not utilize the full magnification range of the compound microscope. Pupil modulation contrast requires a coherent light source, which is costly and requires additional safety measures to ensure the laser safety. Moreover, the achievable resolution is reduced by coherent illumination.

Furthermore, reference is made to Z. Phillips et al., *PLoS ONE* 12 (2017), e0171228; W. Lee et al., *Opt. Exp.* 25 (2017), 8398 as prior art, in which a method for differential phase contrast is disclosed, in which images are recorded simultaneously. This is achieved by spectral coding of an illumination pupil. However, the method also has the disadvantages mentioned in conjunction with differential phase contrast.

SUMMARY

In an embodiment, the present disclosure provides a microscopic transmitted light contrasting method. The method includes at least partially illuminating a sample through an asymmetrical first illumination pupil and at least partially imaging the sample through an asymmetrical first detection pupil in order to generate a first partial image. The first illumination pupil and the first detection pupil are arranged pivoted in relation to one another and partially overlapping one another in projection on a plane perpendicular to an optical axis in such a way that at least one first region of an angular space is in a bright field and one second region of the angular space different from the first region is in a dark field, and the first partial image has a first bright field component and a first dark field component. The method also includes at least partially illuminating the sample through an asymmetrical second illumination pupil and at least partially imaging the sample through an asymmetrical second detection pupil in order to generate a second partial image. The second illumination pupil and the second detection pupil are arranged pivoted in relation to one another and partially overlapping one another in projection on the plane perpendicular to the optical axis in such a way that at least one third region of the angular space is in a bright field and one fourth region of the angular space different from the third region is in a dark field, and the second partial image has a second bright field component and a second dark field component. An image of the sample is generated from the first partial image and the second partial image.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
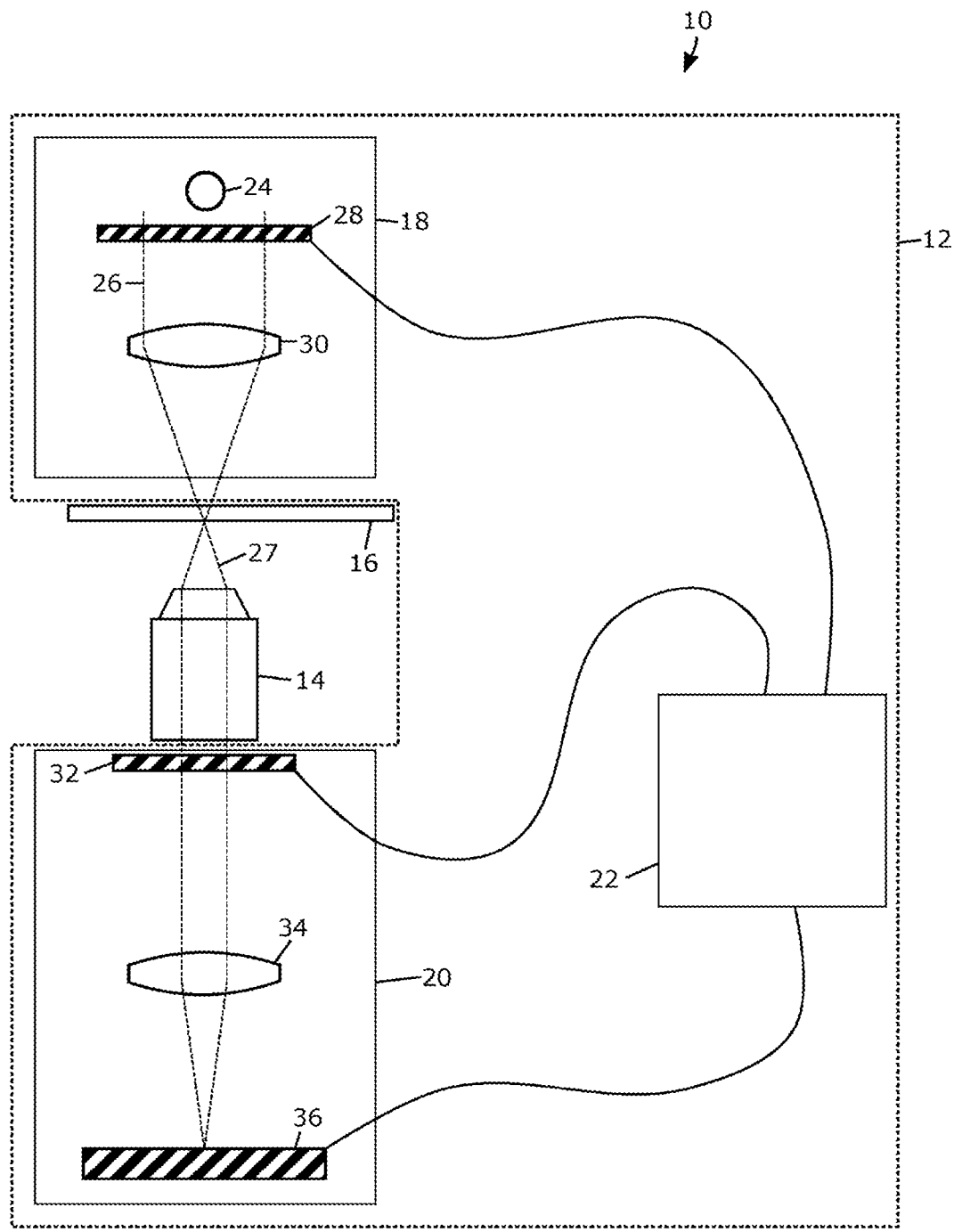
FIG. 1 shows a schematic illustration of a transmitted light microscope as a first exemplary embodiment.

In an embodiment, the present invention provides a microscopic transmitted light contrasting method, via which the accessible magnification range and aperture range of a compound microscope is usable. In another embodiment, the present invention provides a device, using which a corresponding microscopic transmitted light contrasting method can be carried out.

In the microscopic transmitted light contrasting method according to an embodiment of the invention, a sample is at least partially illuminated by an asymmetrical first illumination pupil and the sample is at least partially imaged by an asymmetrical first detection pupil in order to generate a first partial image, wherein the first illumination pupil and the first detection pupil are arranged pivoted in relation to one another and partially overlapping one another in projection on a plane perpendicular to an optical axis in such a way that at least one first region of the angular space is in a bright field and a second region of the angular space different from the first region is in a dark field. Furthermore, the sample is at least partially illuminated by an asymmetrical second illumination pupil, and the sample is at least partially imaged by an asymmetrical second detection pupil in order to generate a second partial image, wherein the second illumination pupil and the second detection pupil are arranged pivoted in relation to one another and partially overlapping one another on the plane perpendicular to the optical axis in such a way that at least one third region of the angular space is in a bright field and one fourth region of the angular space different from the third region is in a dark field. An image of the sample is generated from the first partial image and the second partial image.

Angular space is understood in the present application as the space of the spatial frequency spectrum, which is also referred to as the angular spectrum in particular in the optics of plane waves, of the two partial images. The angular space thus represents the space of the Fourier transforms of the two partial images.

In the present application, the term "asymmetrical" relates to the optical axis of an objective which is associated with the two detection pupils, i.e., the pupils referred to as asymmetrical are not, as is otherwise typical in transmitted light microscopy, rotationally symmetrical with respect to the optical axis of the objective associated with the two detection pupils. For example, the two illumination pupils and the two detection pupils each have the shape of a circular sector, a circular segment, or a circular arc. The respective pivot of the two illumination pupils and the two detection pupils in relation to one another is also referred to hereinafter as the polar pivot. The term "polar" refers here to a polar coordinate system, the pole direction of which is defined by the optical axis of the objective.

Viewed from the objective, on the one hand, the first illumination pupil and the first detection pupil and, on the other hand, the second illumination pupil and the second detection pupil each partially overlap. In this way, the first and the second partial image will each have a bright field component, i.e., a bright background, and a dark field component, i.e., a dark background. The illumination pupils thus implement an asymmetrical illumination of the sample.

The bright field component of the first or second partial image depicts high-contrast and colored details of the sample—so-called amplitude objects or structures. In contrast, in the dark field component, respective transparent or nearly transparent details of the sample—so-called phase objects or structures—are depicted, which only change the phase of the light beams passing through them. Accordingly, the dark field component ensures the phase sensitivity of the method. By way of a combination of bright field component and dark field component of the first and second partial image, both phase information and also amplitude information of the sample can be represented in the image generated from the partial images. A high-contrast image of the sample can be generated by the combination of phase information and amplitude information. Since the image of the sample is more or less composed of multiple partial images and thus does not require illumination of an entire objective pupil, the method according to an embodiment of the invention can be used both with high-aperture objectives and also with low-aperture objectives. In particular, it is unimportant in the method according to an embodiment of the invention whether the illumination aperture is larger or smaller than the aperture of the objective. This is advantageous in particular in a compound microscope having exchangeable objectives. Furthermore, the method according to an embodiment of the invention can be implemented using only one single sensor element, so that the full magnification range of the compound microscope can be utilized.

It is obvious that in the method according to an embodiment of the invention, more than two partial images can also be generated, from which the image of the sample is generated. A further asymmetrical illumination pupil and a further asymmetrical detection pupil are associated here with each further partial image, which are arranged in relation to one another in such a way that at least one region of the angular space is in a bright field and a further region of the angular space different from this region is in a dark field.

In one advantageous refinement, the sample is at least partially illuminated using first illumination light by the first illumination pupil, the sample is at least partially illuminated using second illumination light by the second illumination pupil, wherein the first illumination light and the second illumination light have different spectral compositions. The first partial image and the second partial image are preferably recorded simultaneously. In particular if dynamic processes are recorded in the sample, this prevents the occurrence of image artifacts due to a time-offset recording of the first partial image and the second partial image. In this context, this is also referred to as spectral coding of the respective illumination pupil. This permits regions of the angular space in the two partial images to be separated from one another through the two illumination pupils. This separation can be implemented, for example by a Bayer matrix in front of a CCD or CMOS camera, or by a spectrally splitting prism arrangement in front of a plurality of monochromatic CCD or CMOS cameras, or also by the use of dichroic beam splitter plates.

In a further advantageous refinement, an adaptation of the sampling, i.e., the sampling rate, a noise reduction, or a spectral redistribution is carried out for the first partial image and/or the second partial image. Before further processing takes place to generate the image of the sample, various image processing operations can be applied to the first partial image and/or the second partial image in order to improve the image quality of the two partial images and the image of the sample generated therefrom.

The image of the sample is preferably generated in that a complex transfer function of the sample is numerically reconstructed from the first partial image and the second partial image. The complex transfer function of the sample, which is also referred to as a complex scattering function, comprises phase and amplitude information of the sample. It can be numerically calculated with the aid of the phase and amplitude transfer functions of the device used for imaging using methods known in the prior art, for example with the aid of a Wiener filter or with the aid of iterative methods, as are described, for example in M. Chen et al., *Biomed. Opt. Exp.* 7 (2016), 3940.

In one advantageous refinement, the steps for generating the image are repeated for various layers of the sample, and an image stack is generated from the images generated in this way.

In a further advantageous refinement, an illumination profile of the first illumination pupil and/or an illumination profile of the second illumination pupil is acquired. This permits an adaptive adjustment of the asymmetrical illumination, in particular of the angular spectrum, by comparing a target value of the illumination profile to the acquired actual value of the illumination profile and by adjusting the first illumination pupil and/or the second illumination pupil.

In one advantageous refinement, an image of the first illumination pupil and/or the second illumination pupil is generated after transmission through the sample, and phase and amplitude transfer functions are dynamically calculated with the aid of this image. The dynamically generated phase and amplitude transfer functions—also called optical transfer functions—can be used in particular as the basis of the reconstruction of the complex transfer function of the sample. The use of the dynamically generated phase and amplitude transfer functions has the advantage over the use of predetermined phase and amplitude transfer functions that the reconstruction is independent of short-term changes in the optical system used for imaging. The generation of a dynamic transfer function can also include the extrapolation or modeling of the illumination spectrum in the dark field, since this cannot be imaged by a Bertrand lens system, for example, to measure the illumination spectrum.

In a further advantageous refinement, the first illumination pupil, the second illumination pupil, the first detection pupil, and/or the second detection pupil are shaded.

Preferably, the steps for generating the image are repeated for various shadings of the first illumination pupil, the second illumination pupil, the first detection pupil, and/or the second detection pupil. The crosstalk of color-coded channels is reduced and the signal-to-noise ratio, which has a decisive influence on the quality of the generated image of the sample, is improved by such sequential recording.

The first illumination pupil, the second illumination pupil, the first detection pupil, and/or the second detection pupil preferably each have the shape of a circular sector or a circular segment.

It is advantageous if the first illumination pupil and the second illumination pupil are arranged in relation to one another in such a way that they can be brought into overlap by a rotation, and/or the first detection pupil and the second detection pupil are arranged in relation to one another in such a way that they can be brought into overlap by a rotation. The first partial image and the second partial image have a simple geometrical relationship to one another in this way, whereby it is particularly simple to generate the image of the sample from the first partial image and the second partial image.

An embodiment of the invention furthermore relates to a device for carrying out a microscopic transmitted light contrasting method. The device comprises an illumination unit, which is designed to illuminate a sample at least partially through an asymmetrical first illumination pupil and to illuminate the sample at least partially through an asymmetrical second illumination pupil, a detection unit, which is designed to image the sample at least partially through an asymmetrical first detection pupil in order to generate a first partial image and to image the sample at least partially through an asymmetrical second detection pupil in order to generate a second partial image, wherein the first illumination pupil and the first detection pupil are arranged pivoted in relation to one another and partially overlapping one another in projection on a plane perpendicular to an optical axis in such a way that at least one first region of the angular space is in a bright field and one second region of the angular space different from the first region is in a dark field and the first partial image has a first bright field component and a first dark field component, and wherein the second illumination pupil and the second detection pupil are arranged pivoted in relation to one another and partially overlapping one another in projection on the plane perpendicular to the optical axis in such a way that at least one third region of the angular space is in a bright field and one fourth region of the angular space different from the third region is in a dark field and the second partial image has a second bright field component and a second dark field component, and a control unit, which is designed to generate an image of the sample from the first partial image and the second partial image.

The illumination unit preferably comprises a first modulator element for generating the first illumination pupil and the second illumination pupil, and the detection unit comprises a second modulator element for generating the first detection pupil and the second detection pupil. The first and the second modulator element physically generate the first and the second illumination pupil or the first and the second detection pupil, respectively, like an aperture. The first modulator element and/or the second modulator element can include various apertures, a system of exchangeable apertures, a micromirror arrangement, or spatial light modulators—abbreviated SLM. Alternatively, the first illumination pupil and the second illumination pupil can also be generated by LED arrays.

In one advantageous refinement, the device comprises a Bertrand lens system for detecting the illumination profile of the first detection pupil and/or the illumination profile of the second detection pupil. The Bertrand lens system permits a conoscopic observation of the first detection pupil and/or the second detection pupil. In this way, an adaptive adjustment of the asymmetrical illumination by an adjustment of the first illumination pupil and/or the second illumination pupil, for example by control of the first modulator element, is enabled.

The illumination unit preferably comprises an incoherent light source. Incoherent light sources are more cost-effective than coherent light sources, i.e., laser light sources. Furthermore, complex measures for ensuring the laser safety are dispensed with.

An embodiment of the invention furthermore relates to a microscope, in particular a transmitted light microscope, having a device of the above-described type. The microscope can be designed both as an upright microscope and also as an inverse microscope.

FIG. 1 shows a schematic illustration of a transmitted light microscope 10 as a first exemplary embodiment. The transmitted light microscope 10 comprises a device 12 for carrying out a microscopic transmitted light contrasting method and an objective 14, which is oriented on a sample 16. The device 12 comprises an illumination unit 18 for illuminating the sample 16, a detection unit 20, and a control unit 22.

The illumination unit 18 comprises a light source 24 for generating incoherent illumination light 26, a first modulator element 28, which is arranged in a pupil plane of the illumination device 18 and is formed, for example, by a system of exchangeable apertures, a micromirror arrangement, or a spatial light modulator, and a condenser 30. The illumination light 26 generated by the light source 24 is incident after passage through the first modulator element 28 on the condenser 30, which guides the illumination light 26 onto the sample 16.

The sample 16 scatters and/or attenuates the illumination light 26, whereby detection light 27 results from the illumination light 26, which is used to image the sample 16. The detection light 27 originating from the sample 16 is guided by the objective 14 into the detection unit 20.

The detection unit 20 comprises a second modulator element 32, which is arranged in a pupil plane of the objective 14 and is formed, for example, by a system of exchangeable apertures, a micromirror arrangement, or a spatial light modulator. If the objective 14 does not have a pupil plane which lies outside the objective 14, the pupil plane lying inside the objective 14 can be realistically imaged by a matching relay system outside the objective 14 and the second modulator element 32 can be positioned in this realistic intermediate pupil plane. The detection unit 20 furthermore comprises a tube lens 34 and a location-resolved detector element 36, for example a CCD or CMOS element.

The detection light 27 originating from the sample 16 is first guided by the objective 14 onto the second modulator element 32. After passing through the second modulator element 32, the detection light 27 is incident through the tube lens 34 on the detector element 36. The tube lens can also be omitted for the case of single-step imaging having an objective 14 corrected for finite tube length.

Figure 2:
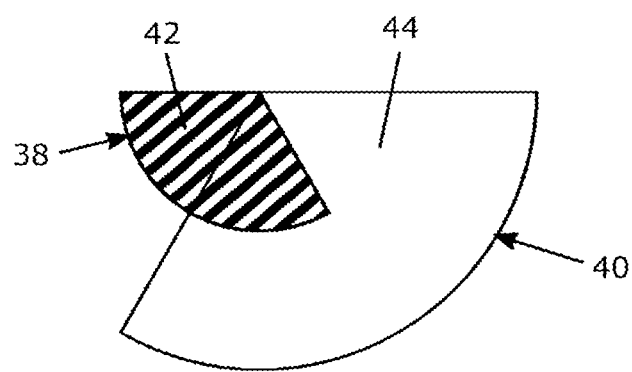
FIG. 2 shows a schematic illustration of the location of a first illumination pupil and a first detection pupil relative to one another in the transmitted light microscope according to FIG. 1.

The control unit 22 controls the first modulator element 28 to generate a first illumination pupil 38, which is shown in greater detail in FIG. 2, and a second illumination pupil. In this way, the control unit 22 dynamically controls which regions of the angular space are illuminated by the illumination light 26. The control unit 22 additionally controls the second modulator element 32 to generate a first detection pupil 40, which is shown in greater detail in FIG. 2, and controls a second detection pupil. In this way, the control unit 22 dynamically controls which regions of the angular space are imaged by the detection unit 20. Furthermore, the control unit 22 controls the detector element 36 in such a way that a first partial image, which is associated with the first illumination pupil 38 and the first detection pupil 40, and a second partial image, which is associated with the second illumination pupil and the second detection pupil, are generated, and an image of the sample 16 is generated from the first partial image and the second partial image.

Only two partial images are recorded to generate the image of the sample 16 in the first exemplary embodiment. However, more than two partial images can be recorded. For this purpose, the control unit 22 controls the first modulator element 28 to generate further illumination pupils and the second modulator element 32 to generate further detection pupils. Furthermore, the control unit 22 controls the detector element 36 in such a way that further partial images are generated, which are each associated with one further illumination pupil and one further detection pupil, and that the image of the sample 16 is generated from the first partial image, the second partial image, and the further partial images.

FIG. 2 shows a schematic illustration of the location of the first illumination pupil 38 and the first detection pupil 40 relative to one another in the transmitted light microscope according to FIG. 1. The illustration in FIG. 2 shows the pupils 38, 40 seen from the objective 14.

The first illumination pupil 38 and the first detection pupil 40 are arranged in such a way that they partially overlap. In this way, a first illumination region 42, which implements a dark field illumination, and a second illumination region 44, which implements a bright field illumination, result. The first partial image imaged by the first detection pupil 40 thus has a bright field component and a dark field component.

In the exemplary embodiment shown in FIG. 2, the aperture of the first detection pupil 40 is twice as large as the aperture of the first illumination pupil 38. In an alternative exemplary embodiment, the aperture of the first detection pupil 40 can also be smaller than the aperture of the first illumination pupil 38. The first illumination pupil 38 and the first detection pupil 40 each have the shape of a circular sector, wherein the center point angle has the value 120°. The second illumination pupil and the second detection pupil may thus be generated in a simple manner from the first illumination pupil 38 and the first detection pupil 40 by a rotation by 120°. In the exemplary embodiment shown in FIG. 2, the first illumination pupil 38 and the first detection pupil 40 are pivoted in relation to one another by an angle of 60° polar.

If the entire angular space is to be imaged using the transmitted light microscope 10 shown on the basis of FIGS. 1 and 2, a third partial image thus has to be generated, which is associated with a third illumination pupil and a third detection pupil, which are each generated by a rotation of 240° from the first illumination pupil 38 or the first detection pupil 40, respectively.

Figure 3:
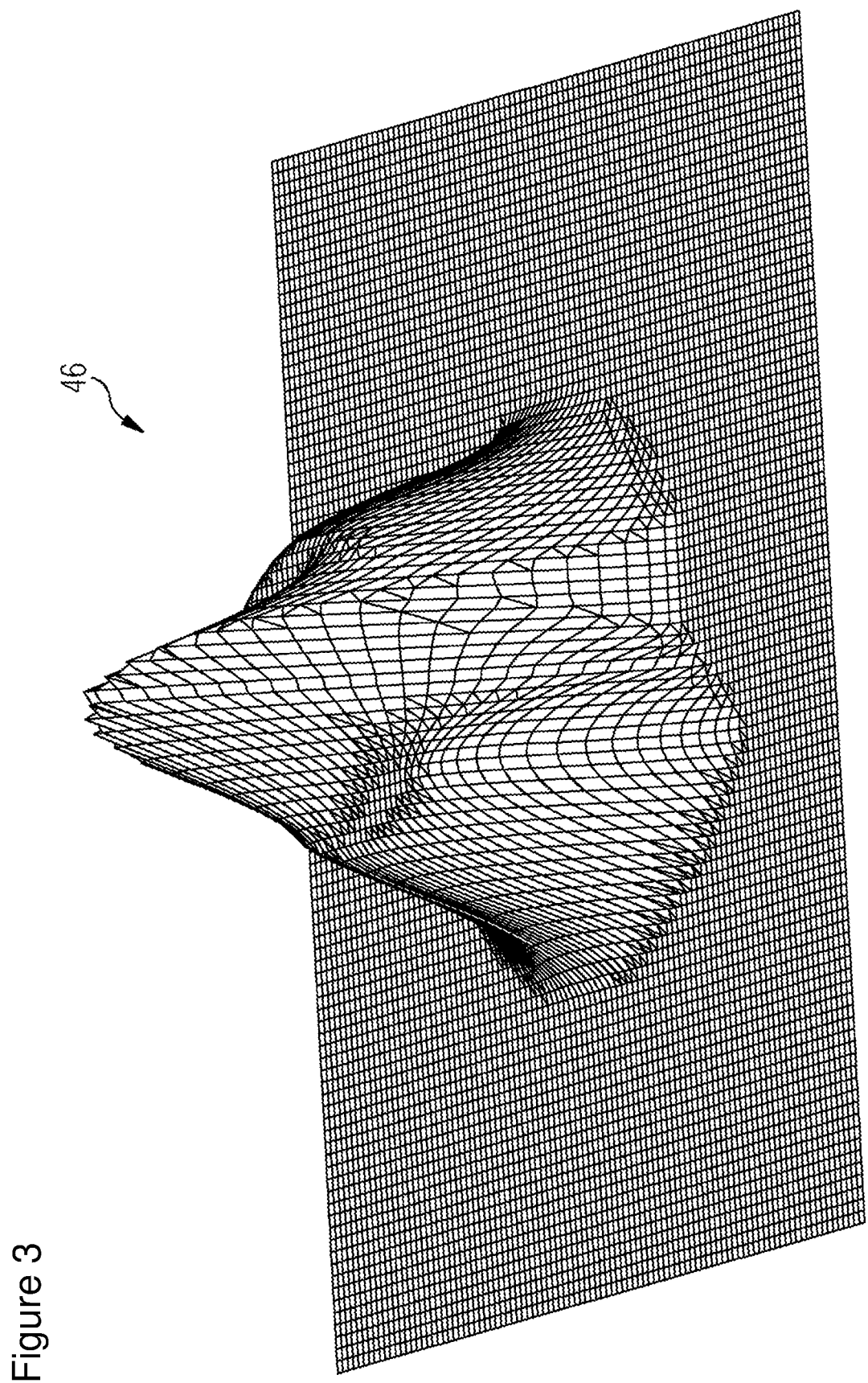
FIG. 3 shows an amplitude transfer function of the transmitted light microscope according to FIG. 1.

FIG. 3 shows an amplitude transfer function 46 of the transmitted light microscope 10 according to FIG. 1 for a partial image. The amplitude transfer function 46 is a function in the angular space and specifies how the amounts of spatial frequencies are transferred by the transmitted light microscope 10.

Figure 4:
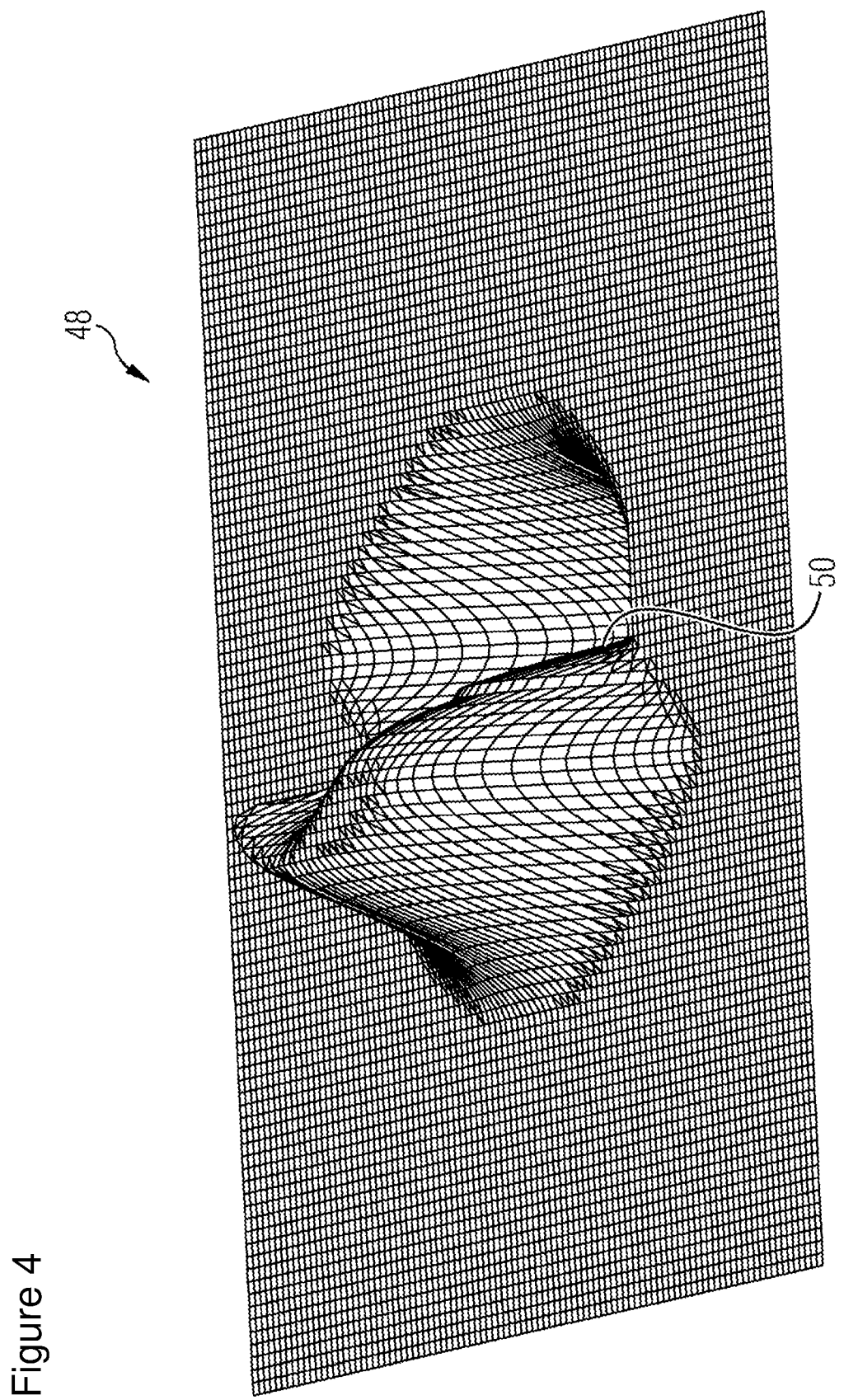
FIG. 4 shows a phase transfer function of the transmitted light microscope according to FIG. 1.

FIG. 4 shows a phase transfer function 48 of the transmitted light microscope 10 according to FIG. 1 for a partial image. The phase transfer function 48 is, like the amplitude transfer function 46, a function in the angular space and specifies how the phases of spatial frequencies are transferred by the transmitted light microscope 10. It has a zero crossing 50 typical for an asymmetrical illumination.

Figure 5:
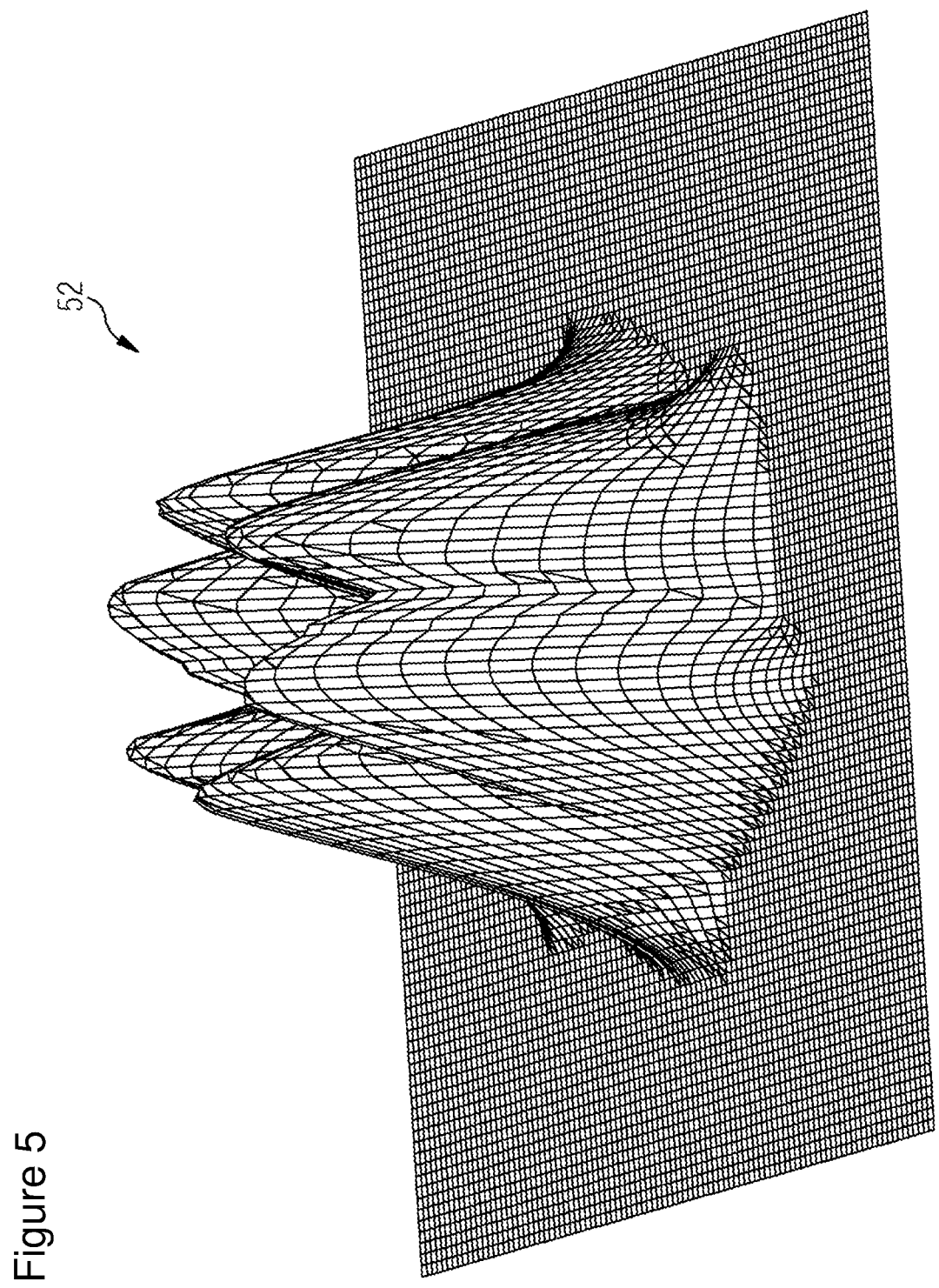
FIG. 5 shows a phase transfer function of an image composed of partial images.

FIG. 5 shows a phase transfer function 52 of the image of the sample 16 generated from the partial images. It can be inferred from FIG. 5 that due to the combination of multiple partial images of the sample 16, the range of the spatial frequencies imaged by the transmitted light microscope 10 is enlarged and the zero crossings 50 of the phase transfer functions of the partial images are removed except for the origin of the angular space, which results in an improvement of the contrast of the image of the sample 16.

Figure 6:
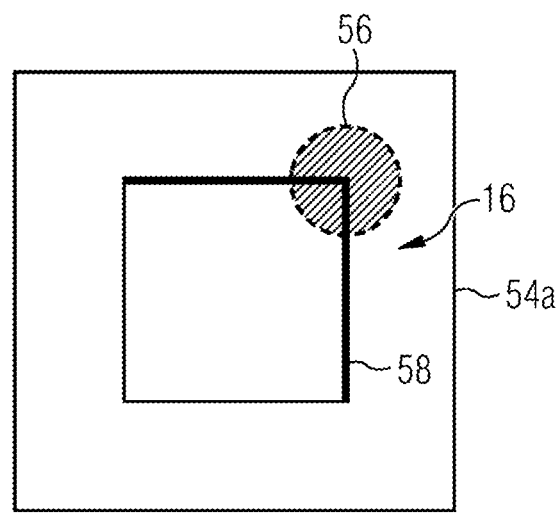
FIG. 6 shows three partial images of the sample which were recorded with the aid of the transmitted light microscope according to FIG. 1.
Figure 6:
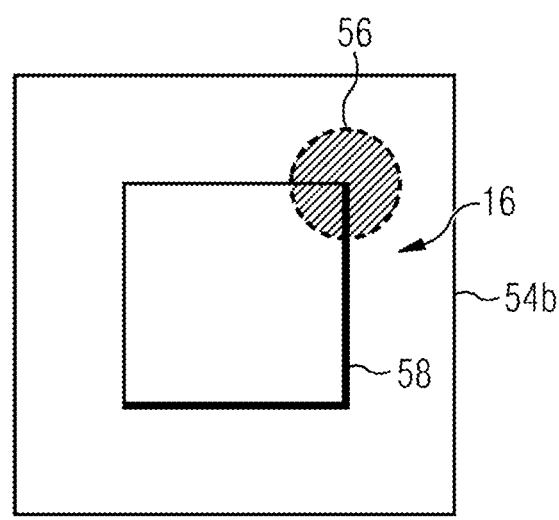
Figure 6:
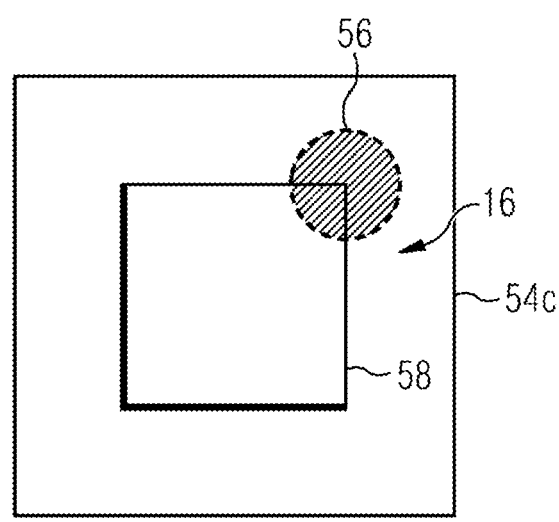

FIG. 6 shows three partial images 54a, 54b, 54c generated by an optical simulation, which were recorded with the aid of the transmitted light microscope 10 according to FIG. 1.

A first partial image 54a of the three partial images 54a, 54b, 54c was illuminated by the first illumination pupil 38 illustrated in FIG. 2 and imaged by the first detection pupil 40 also illustrated in FIG. 2. A second partial image 54b of the three partial images 54a, 54b, 54c was illuminated by the second illumination pupil, which was generated by rotating the first illumination pupil 38 by 120° around the optical axis of the objective 14, and was imaged by the second detection pupil, which was generated by rotating the first detection pupil 40 by 120° around the optical axis of the objective 14. A third partial image 54c of the three partial images 54a, 54b, 54c was illuminated by the third illumination pupil, which was generated by rotating the first illumination pupil 38 by 240° around the optical axis of the objective 14, and imaged by the third detection pupil, which was generated by rotating the first detection pupil 40 by 240° around the optical axis of the objective 14.

Each of the three partial images 54a, 54b, 54c shows the sample 16, which has both an amplitude structure 56 and also a transparent phase structure 58.

Figure 7:
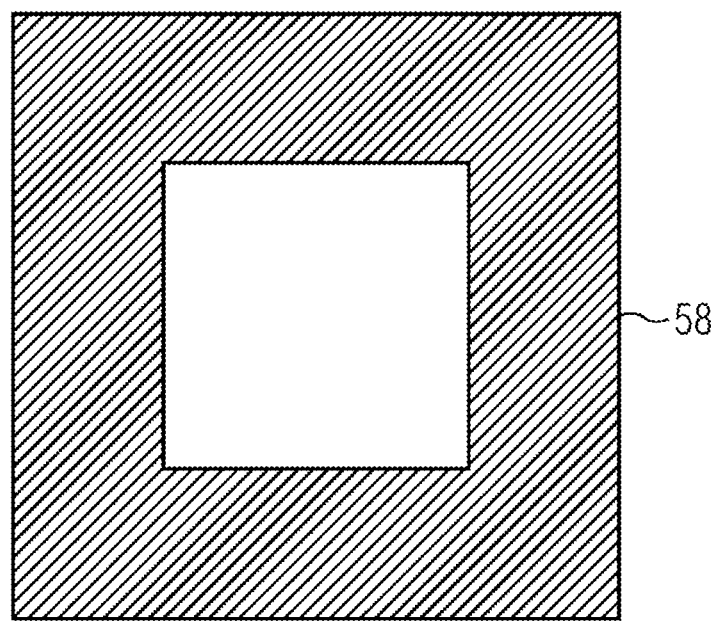
FIG. 7 shows the amplitude structures and phase structures of the sample reconstructed with the aid of a Wiener filter from the three partial images.
Figure 7:
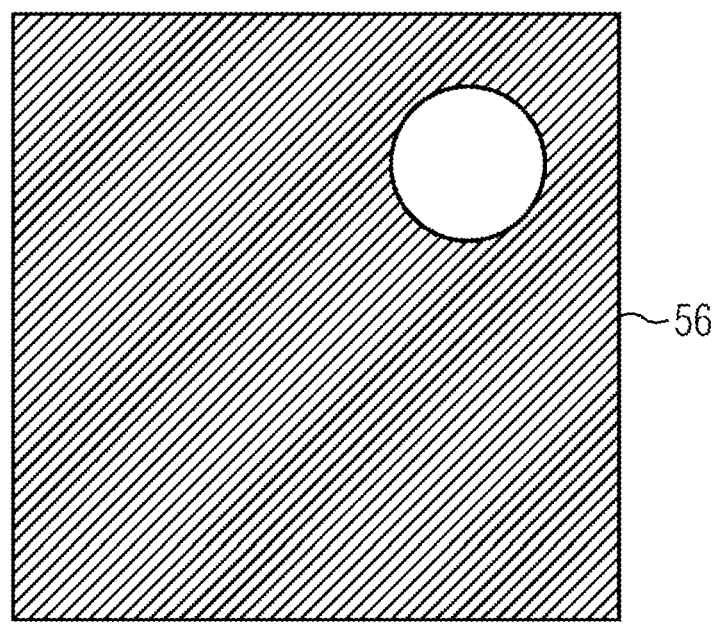

FIG. 7 shows the amplitude structures 56 and phase structures 58 of the sample 16 reconstructed with the aid of a Wiener filter from the three partial images 54a, 54b, 54c.

Figure 8:
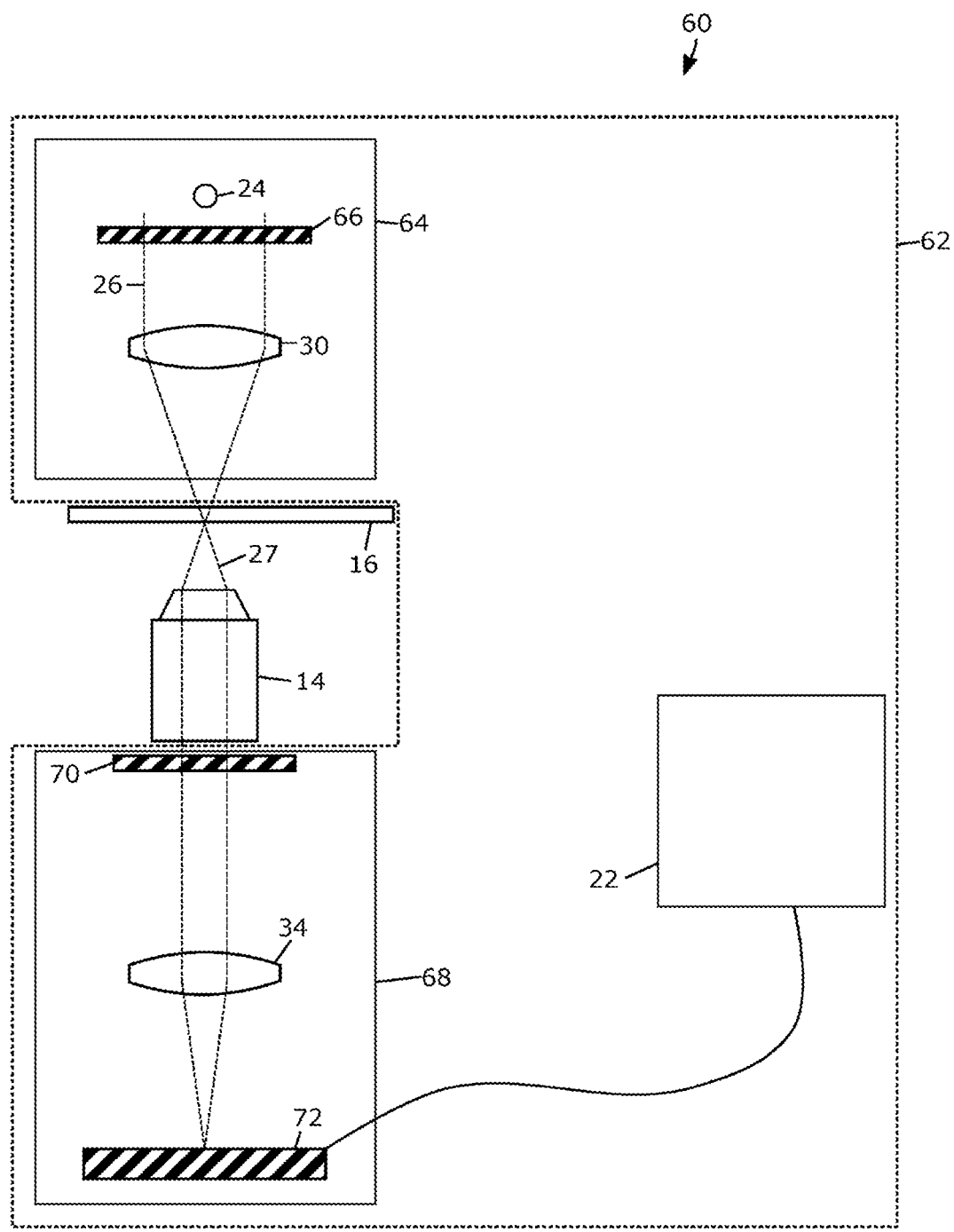
FIG. 8 shows a schematic illustration of a transmitted light microscope as a second exemplary embodiment.

FIG. 8 shows a schematic illustration of a transmitted light microscope 60 as a second exemplary embodiment. The transmitted light microscope 60 shown in FIG. 8 differs from the transmitted light microscope 10 shown in FIG. 1 essentially in that the control unit 22 does not dynamically control the first modulator element 66 and the second modulator element 70.

The transmitted light microscope 60 according to FIG. 8 comprises the device 62 for carrying out the transmitted light contrasting method according to an embodiment of the invention. The device 62 comprises the illumination unit 64 for illuminating the sample 16 and the detection unit 70. Identical or identically acting elements are provided with identical reference signs in FIGS. 1 and 8.

The illumination unit 64 comprises the first modulator element 66, which is arranged in a pupil plane of the illumination device 18 and is designed to spectrally code the illumination light 26 originating from the light source 24 in accordance with the first illumination pupil 38 and the second illumination pupil. This can take place, for example, with the aid of multiple spectral filters, which are each formed in the form of the first illumination pupil 38 or the second illumination pupil.

The detection unit 68 comprises the second modulator element 70, which is arranged in the pupil plane of the objective 14 and is designed to spectrally code the detection light 27 originating from the sample 16 in accordance with the first detection pupil 40 and the second detection pupil, and also the location-resolved detector element 72. The location-resolved detector element 72 is designed to separate the detection light 27 into two partial images. This separation is carried out by a Bayer matrix.

The control unit 22 controls the detector element 72 in such a way that the first partial image, which is associated with the first illumination pupil 38 and the first detection pupil 40, and the second partial image, which is associated with the second illumination pupil and the second detection pupil, are generated simultaneously, and the image of the sample 16 is generated from the first partial image and the second partial image.

Figure 9:
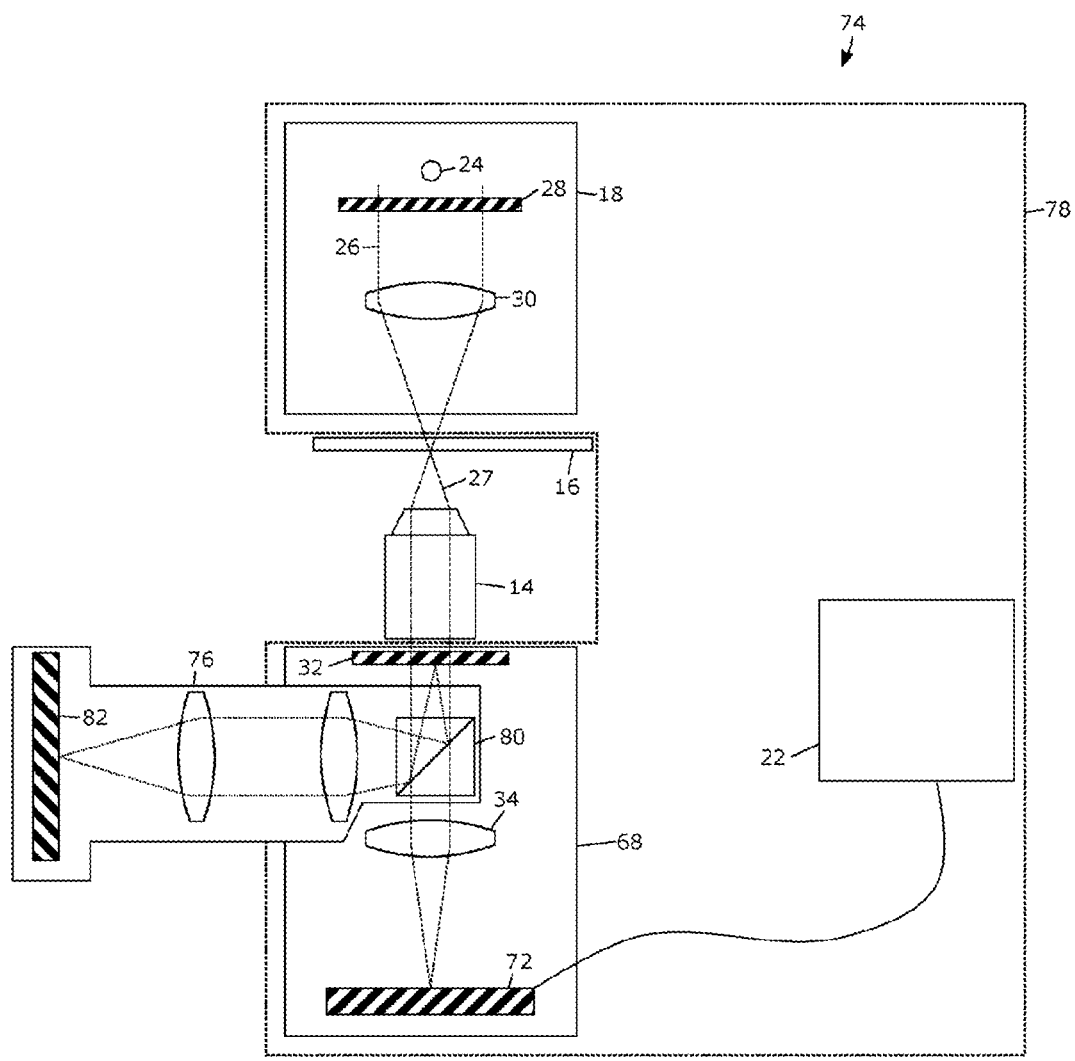
FIG. 9 shows a schematic illustration of a transmitted light microscope having a Bertrand lens system as a third exemplary embodiment.

FIG. 9 shows a schematic illustration of a transmitted light microscope 74 as a third exemplary embodiment. The transmitted light microscope 74 shown in FIG. 9 differs from the transmitted light microscope 10 shown in FIG. 1 essentially in that the device 78 for carrying out the transmitted light contrasting method according to an embodiment of the invention additionally comprises a Bertrand lens system 76. Identical or identically acting elements are provided with identical reference signs in FIGS. 1 and 9.

The Bertrand lens system 76 comprises a beam splitter 80 arranged in a focal plane of the objective 14, with the aid of which a part of the illumination light 27 is guided onto a further location-resolved detector element 82. It is possible to acquire the illumination profile of the detection pupils by way of the Bertrand lens system 76. This in turn permits the control unit 22 to adaptively adjust the angular spectrum of the illumination by the illumination unit 18 by controlling the modulator element 28.

Identical or identically acting features are provided with identical reference signs in FIGS. 1 and 9.

Figure 10:
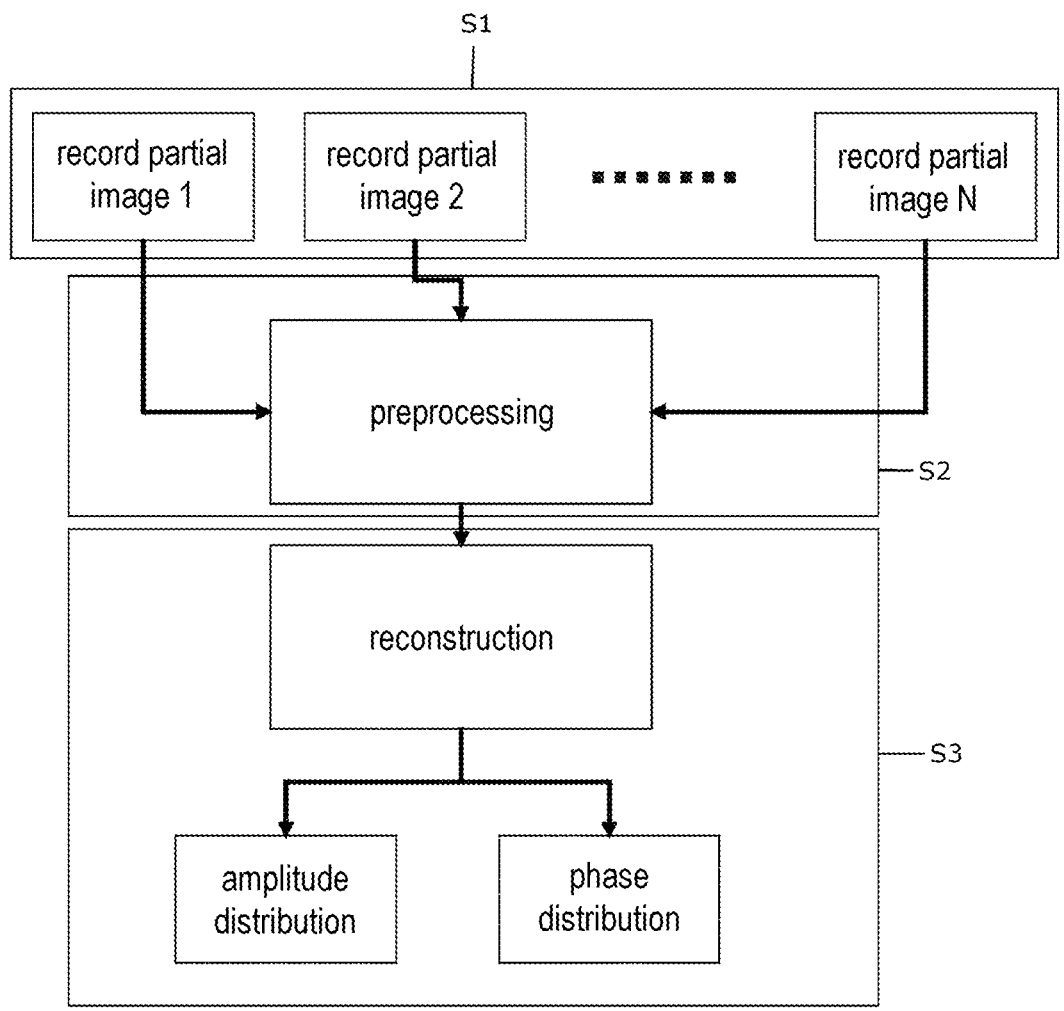
FIG. 10 shows a flow chart which shows a special embodiment of the microscopic transmitted light contrasting method according to the invention.

FIG. 10 shows a flow chart, which shows a special embodiment of the microscopic transmitted light contrasting method according to the invention.

In a first step S1, a total of N partial images are recorded. The partial images are each associated with precisely one illumination pupil and one detection pupil. The illumination pupil and the detection pupil are each arranged in relation to one another in such a way that at least one region of the angular space is in a bright field and a further region of the angular space different from this region is in a dark field. Each of the N partial images thus has a bright field component and a dark field component. The recording of the N partial images can take place sequentially, i.e., in chronological succession, or simultaneously, i.e., at the same time. If the recording takes place simultaneously, a spectral coding of the illumination pupil has to be carried out in each case, as described in greater detail above in conjunction with FIG. 8.

In a second step S2, the N partial images are preprocessed, i.e., for example, the sampling is adapted for each partial image, a noise reduction is carried out, and/or a spectral redistribution is carried out. This is used to improve the image quality of the image of the sample 16 reconstructed from the N partial images.

In a third step S3, the complex transmission function, i.e., the complex scattering potential, of the sample 16 is reconstructed from the N partial images and the associated transfer functions, i.e., the optical transfer functions, as the image of the sample 16. This can be carried out, for example via a Wiener filter or via iterative methods, as are described, for example, in M. Chen et al., *Biomed. Opt. Exp.* 7 (2016), 3940. One example of such a reconstruction is shown in FIGS. 6 and 7. The complex transmission function of the sample 16 can be represented in particular as separate amplitude distributions and as phase distributions.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 transmitted light microscope
12 device
14 objective
16 sample
18 illumination unit
20 detection unit
22 control unit
24 light source
26 illumination light
27 detection light
28 modulator element
30 condenser
32 modulator element
34 tube lens
36 detector element
38 illumination pupil
40 detection pupil
42, 44 region
46, 48 transfer function
50 zero crossing
52 transfer function
54a, 54b, 54c partial image
56 amplitude object
58 phase object
60 transmitted light microscope
62 device
64 illumination unit
66 modulator element
68 detection unit
70 modulator element
72 detector element
74 transmitted light microscope
76 Bertrand lens system
78 device
80 beam splitter
82 detector element

The invention claimed is:

1. A microscopic transmitted light contrasting method, the method comprising:
at least partially illuminating a sample through an asymmetrical first illumination pupil;
at least partially imaging the sample through an asymmetrical first detection pupil in order to generate a first partial image, wherein the first illumination pupil and the first detection pupil are arranged pivoted in relation to one another and partially overlapping one another in projection on a plane perpendicular to an optical axis in such a way that at least one first region of an angular space is in a bright field and one second region of the angular space different from the first region is in a dark field, and the first partial image has a first bright field component and a first dark field component;
at least partially illuminating the sample through an asymmetrical second illumination pupil;
at least partially imaging the sample through an asymmetrical second detection pupil in order to generate a second partial image, wherein the second illumination pupil and the second detection pupil are arranged pivoted in relation to one another and partially overlapping one another in projection on the plane perpendicular to the optical axis in such a way that at least one third region of the angular space is in a bright field and one fourth region of the angular space different from the third region is in a dark field, and the second partial image has a second bright field component and a second dark field component; and
generating an image of the sample from the first partial image and the second partial image.

2. The method as claimed in claim 1, wherein the sample is at least partially illuminated using first illumination light through the first illumination pupil, the sample is at least partially illuminated using second illumination light through the second illumination pupil, and the first illumination light and the second illumination light have different spectral compositions.

3. The method as claimed in claim 2, wherein the first partial image and the second partial image are generated simultaneously.

4. The method as claimed in claim 1, wherein an adjustment of a sampling, a noise reduction, or a spectral redistribution is carried out for the first partial image and/or the second partial image.

5. The method as claimed in claim 1, wherein the image of the sample is generated in that a complex transmission function of the sample is numerically reconstructed from the first partial image and the second partial image.

6. The method as claimed in claim 1, wherein the steps for generating the image of the sample are repeated for various layers of the sample and an image stack is generated from the images generated in this way.

7. The method as claimed in claim 1, further comprising acquiring an illumination profile of the first illumination pupil and/or an illumination profile of the second illumination pupil.

8. The method as claimed in claim 1, further comprising generating an image of the first illumination pupil and/or the second illumination pupil after transmission through the sample, and calculating phase and amplitude transfer functions using the image of the first illumination pupil and/or the second illumination pupil.

9. The method as claimed in claim 1, wherein the first illumination pupil, the second illumination pupil, the first detection pupil, and/or the second detection pupil are shaded.

10. The method as claimed in claim 9, wherein the steps for generating the image are repeated for various shadings of the first illumination pupil, the second illumination pupil, the first detection pupil, and/or the second detection pupil.

11. The method as claimed in claim 1, wherein the first illumination pupil, the second illumination pupil, the first detection pupil, and/or the second detection pupil is/are shaped as a circular sector or a circular segment.

12. The method as claimed in claim 1, wherein the first illumination pupil and the second illumination pupil are arranged in relation to one another in such a way that the first illumination pupil and the second illumination pupil can be brought into overlap by a rotation, and/or the first detection pupil and the second detection pupil are arranged in relation to one another in such a way that the first illumination pupil and the second illumination pupil can be brought into overlap by a rotation.

13. A device for carrying out a microscopic transmitted light contrasting method, the device comprising:
- an illuminator configured to illuminate a sample, at least partially, through an asymmetrical first illumination pupil and to illuminate the sample, at least partially, through an asymmetrical second illumination pupil;
- a detector configured to at least partially image the sample through an asymmetrical first detection pupil, in order to generate a first partial image, and to image the sample at least partially through an asymmetrical second detection pupil, in order to generate a second partial image, wherein the first illumination pupil and the first detection pupil are arranged pivoted in relation to one another and partially overlapping one another in projection on a plane perpendicular to an optical axis in such a way that at least one first region of an angular space is in a bright field and one second region of the angular space different from the first region is in a dark field, and the first partial image has a first bright field component and a first dark field component, and wherein the second illumination pupil and the second detection pupil are arranged pivoted in relation to one another and partially overlapping one another in projection on the plane perpendicular to the optical axis in such a way that at least one third region of the angular space is in a bright field and one fourth region of the angular space different from the third region is in a dark field and the second partial image has a second bright field component and a second dark field component, and
- a controller configured to generate an image of the sample from the first partial image and the second partial image.

14. The device as claimed in claim 13, wherein the illuminator comprises a first element of a modulator configured to generate the first illumination pupil and the second illumination pupil, and the detector comprises a second element of the modulator configured to generate the first detection pupil and the second detection pupil.

15. The device as claimed in claim 13, further comprising a Bertrand lens system configured to detect an illumination profile of the first detection pupil and/or an illumination profile of the second detection pupil.

16. A microscope comprising the device as claimed in claim 13.

* * * * *